: 3,100,808
HYDROGENATION OF SATURATED ISOBUTYLENE POLYMER
Robert H. Dyer, Big Spring, Tex., assignor to Cosden Petroleum Corporation, Big Spring, Tex., a corporation of Delaware
No Drawing. Filed Aug. 18, 1961, Ser. No. 132,297
5 Claims. (Cl. 260—683.9)

This invention relates to purified substantially saturated polymers and to the purification of such products by hydrogenation. More particularly, the invention relates to a purified polymer of a lower mono olefine polymer such as polybutene having improved color, odor, and stability such as heat, light, and storage stability, and further to the hydrogenation of substantially saturated polymers of lower mono olefines such as polybutenes to render them substantially colorless, odorless, and stable.

Mono olefine polymers, as produced in the art of various molecular weights usually above about 400 to 600 and from various $C_2$–$C_5$ lower olefine hydrocarbons, are normally substantially saturated and are relatively light colored, such as light amber. They usually carry slight oily to pungent odors often attributed to residuals of refining chemicals. The substantially saturated polymers may be formed of any of the $C_2$–$C_5$ lower mono olefines, and are sometimes formed of mixtures of two or more of these in a wide range of liquid to solid polymers.

It was considered in the art that a product as pure as desired may be obtainable simply by selecting a raw feed gas of the monomer mono olefine in the desired state of purity prior to polymerization. The purification process, of such raw feed gases, for example, gases as made available from petroleum refinery or natural gases as source materials, becomes very expensive and even feed gases considered to be of relatively high purity always contain a few percent of contaminant homologous gases of higher or lower molecular weight.

On the other hand, it has often been desirable to utilize any olefine source gas from which the polymer is to be formed in which the desired olefine is merely a predominant component of a gaseous mixture with other hydrocarbons which may or may not be saturated, such gases serving as a carrier for the desired olefine. The polymeric product formed is more economical despite the presence of small quantities of higher or lower olefine impurities. It is commonly overlooked, however, that the gases usually are subjected to drastic process treatments in the usual petroleum refinery operation which results in the inclusion of other elemental impurities which comprise primarily oxygen in small quantities, but even nitrogen and sulfur may exist in trace quantities which ultimately become included in the final polymeric product. These elemental impurities may largely contribute as color or odor-imparting components of the polymer.

According to the present invention, I have found that if a substantially saturated polymer such as a lower olefine polymer formed from an olefine monomer having from about two to five carbon atoms, and usually mixtures from petroleum refinery gas sources such as polybutene is hydrogenated, the original apparently saturated product is substantially improved in color, odor, and general stability without materially affecting other physical characteristics of the product for its known uses. Thus, lower molecular weight polymers ranging from light liquids having a comparatively low molecular weight of usually about 400 to 600 ranging through highly viscous higher molecular weight liquids greater than 800 and up to about 20,000 M.W. and solids whose molecular weights are much greater, such as 50,000 to 200,000 M.W., may be purified to have improved color, odor, and stability characteristics by hydrogenation.

According to this invention, various lower monoolefine polymers and particularly such products as polybutene may be hydrogenated to improve the characteristics of color, odor, and general stability. The polybutene may be formed by polymerization of mixed petroleum refinery gases ranging from $C_1$ through $C_5$ having several polymerizable components such as ethylene, propylene, butenes, isobutylene, and amylenes, in which the $C_4$ components usually predominate. That product whether because of a content of complex interpolymers, a slight content of unsaturates or because some of the olefines polymerized may include oxygen, nitrogen, or sometimes sulfur, have a strong oily to pungent odor and a light amber color, as commercially produced. It is found upon hydrogenation by generally known procedures, with or without catalysts and at moderately raised to high temperatures and atmospheric to high pressures, that both the color and odor of the hydrogenated product are materially improved.

It is preferred in any case, however, to hydrogenate a polymeric product to improve its stability such as a color of about one, two, or more Gardner, at raised temperatures in the range of about 150 to 700° F. with hydrogen gas at a pressure ranging from about atmospheric to 1,500 to about 3,000 p.s.i. for a period ranging from about a minute under strong hydrogenating conditions up to many hours, often as much as 24 to 36 hours, at ambient temperatures. The hydrogenation may be effected upon the polymeric materials either in continuous or batch processes. The hydrogenation may be carried out by exposing the polymeric materials over long periods of contact under atmospheric or under high pressure conditions usually for short periods.

The polymeric materials may be hydrogenated by agitation of a liquid polymer, the hydrogenation being performed under temperatures up to the limit of the range stated and also, if preferred, in the presence of a hydrogenation catalyst. Preferred hydrogenation catalysts include nickel, platinum, cobalt, palladium, and their compounds, and the like.

Intermediate viscosity polymeric materials may be heated to lower the viscosity and then hydrogenated. They may be hydrogenated directly in their normal non-viscous to viscous form, or they, as well as solid polymers, may be dissolved in a solvent which preferably is not hydrogenatable. In the cases where the polymeric material is dissolved in a solvent, it is somewhat more economical to separate the polymeric material after hydrogenation and reuse the solvent.

The hydrogenation reduces the odor in each instance. Some of it may be quite pungent and is reduced to at least a bland odor. The color, depending upon the degree of hydrogenation, is reduced from a substantial color, often exceeding about 2 Gardner, down to less than 1 (less than is readily readable on the Gardner scale). That is, about water white. Moreover, the stability of the product is improved. For example, in contrast to other purifications of substantially saturated products, such as, by washing with sulfuric acid, the products still having some residual unsaturation and other impurities which will deteriorate after standing in storage to again increase color, odor, and the like. To this extent the product hereof is stabilized by the hydrogenation so that the valuable properties produced in the hydrogenation of better color, odor, and heat stability are not substantially reduced by standing in storage or by subjecting to substantial heat conditions.

The following examples illustrate the practice of this invention:

Example 1

A glass tube was filled with granules of platinum chloride supported on kieselguhr. The tube was wrapped externally with electrical heating tape and heated to a temperature of 650° F. Hydrogen gas was passed through the catalyst for a period of two hours at a rate of 0.05 cubic foot per second. Thereafter, the temperature was reduced to 400° F. and the hydrogen flow adjusted to 0.03 cubic foot per second. Polybutene, formed by Friedel-Crafts polymerization as described in the U.S. patent to Jackson 2,957,930, and having an initial viscosity (SSU, 210° F.) of 1067, was introduced into the top of the tube and flowed counter-current to the hydrogen at a rate of about 2 grams per minute having a residence time in the tube of approximately two minutes. The properties of the polymeric material before and after the hydrogenation were as follows:

|  | Feed | Product |
| --- | --- | --- |
| Color (Gardner) | 2 | <1 |
| Viscosity (SSU at 210° F.) | 1,067 | 1,087 |
| Bromine number | 16.5 | 8.0 |
| Odor | Pungent | Bland |

Example 2

The same hydrogenation apparatus as described in Example 1 was used except that the catalyst was extruded cobalt molybdate. The same polymeric material as in Example 1 was introduced into the heated glass tube and passed slowly through the tube at a rate to have a residence time in the tube of about 33 minutes. The comparison of the before and after properties of the treated material are as follows:

|  | Feed | Product |
| --- | --- | --- |
| Color (Gardner) | 2 | <2 |
| Viscosity (SSU at 210° F.) | 1,067 | 952 |
| Bromine number | 16.5 | 9.5 |
| Odor | Pungent | Bland |

Example 3

A 50-gram sample of highly fluid polybutene having an average molecular weight of about 840 and a stable viscosity (SSU @ 210° F.) of 1067 and formed as described in Example 1 of said Jackson patent was introduced into a bomb under vacuum and then pressurized with hydrogen gas at a pressure to 1,000 p.s.i. An electric heating tape was wrapped around the bomb which was heated to 400° F. and placed in a hydrogenation rocking mechanism for 24 hours. The following before and after data was obtained:

|  | Feed | Product |
| --- | --- | --- |
| Color (Gardner) | 2 | <1 |
| Viscosity (SSU at 210° F.) | 1,067 | 1,050 |
| Bromine number | 16.5 | 9.2 |
| Odor | Pungent | Bland |

Example 4

A 5-gram sample of polybutene was placed in a similar bomb as in Example 3 along with 0.5 gram of palladium black, pressurized with hydrogen gas to 150 p.s.i. at 800° F. and rocked in the same rocking mechanism as in Example 3 for two hours. The products before and after have the following data:

|  | Feed | Product |
| --- | --- | --- |
| Color (Gardner) | 3 | 2 |
| Viscosity (SSU) | 986 | 982 |
| Bromine number | 13.5 | 6 |
| Odor | Pungent | Bland |

Example 5

One hundred grams of polybutene of Example 1 was dissolved in 100 grams of iso-octane in a stirred reaction vessel at atmospheric pressure. One gram of activated Raney nickel was added to the solution and hydrogen gas was bubbled in for a period of 10 hours. The nickel catalyst was removed by filtration and the iso-octane solvent was removed by distillation in vacuo. The resulting material had a bromine number of 9 and a color of less than 1 (Gardner), and it was substantially odorless.

Example 6

The hydrogenation process of Example 5 was repeated upon the same polymeric material except that a catalyst consisting of 1 gram of palladium black was used instead of 1 gram of Raney nickel. The resultant product after removal of catalyst by filtration and solvent by distillation had a bromine number of 8 and a color of about 1 (Gardner) while being substantially odorless.

Example 7

A stainless steel tube was charged with a catalyst consisting of 20% nickel on Kaiser Xa-144 balls of alumina of 6-8 mesh size. The tube was placed in a furnace and a mixture of polyisobutylene and hydrogen in a 1 to 10 volume ratio respectively was charged using an hourly space velocity of 1.5:1 feed to catalyst ration. The feed was a polyisobutylene of the type described in Example 1 having a viscosity of 1352 (SSU @ 210° F.), an average molecular weight of 950, a bromine number of 13.5, a pungent odor, and a 3 (Gardner) color. The product was found to have a bromine number of 0.7 and a color of much less than 1 (Gardner). The product was substantially odorless.

Example 8

The hydrogenation of Example 7 was repeated, using the same conditions and feed, except that the space velocity was increased to 3:1 of product to catalyst. The product was found to have a bromine number of 4.0 and a color of about 1 (Gardner) with minimum traces of odor.

Example 9

The hydrogenation of Example 7 was again repeated except that the temperature was reduced to 300° F. It was found that the bromine number of the hydrogenated product was 1.5 and the color was about 1 (Gardner).

Example 10

The hydrogenation of Example 7 was again repeated with a space velocity of 3 to 1, product to catalyst. The temperature was 300° F., the color was found to be 1 (Gardner) and the bromine number was 4.5.

Example 11

The hydrogenation of Example 7 was again repeated except that the space velocity was increased to 6 to 1 of product to catalyst. The color of the hydrogenated product was found to be about 2 (Gardner) and the bromine number was 9.0.

Example 12

The hydrogenation in Example 7 was repeated using 0.5% platinum on the same aluminum carrier of 8-10 mesh size. The polymeric material was flowed at a space velocity of 1.5:1 product to catalyst, over the catalyst maintained at 400° F. and a pressure of 50 p.s.i. The hydrogenated product was found to have a color of 1 (Gardner) and a bromine number of 1.5.

Example 13

The product obtained from Example 7 was placed in an open beaker on a hot plate and heated to 200° C. After 24 hours of heating no color degradation was noted nor was the odor level appreciably increased. After 48 hours of heating, the color of the material had increased from less than 1 (Gardner) to a 1 (Gardner).

Example 14

A commercial sample of less than 1 (Gardner) color polyisobutylene of approximately the same average molecular weight as in Example 7, but not hydrogenated, was tested in the same manner as described in Example 13. After 3 hours of heating, the polymeric material had increased from less than 1 (Gardner) to 1 (Gardner). After 6 hours of heating, the material was approximately 2 (Gardner). This clearly demonstrates the superior heat stability of the hydrogenated polyisobutylene over that of the unhydrogenated material.

Example 15

To test the storage qualities of the hydrogenated material, 100 grams of the hydrogenated material obtained as in Example 7 was placed in a carbon steel can, and a lid securely placed over it. Another can of the same construction was charged with 100 grams of commercial non-hydrogenated polyisobutylene of less than 1 (Gardner) color. Both cans were stored under ambient conditions. The two materials were tested at the end of one week. The hydrogenated polyisobutylene was still less than 1 (Gardner) color and essentially odorless, while the non-hydrogenated material had a pungent odor and had a color in excess of 1 (Gardner).

Example 16

The same hydrogenation procedure as in Example 12 was repeated except that the pressure was increased to 350 p.s.i. The color of the product was found to be 1 (Gardner) and the bromine number was 0.7.

Example 17

The run of Example 12 was repeated again under the same conditions for temperature and pressure while the space velocity was increased to 6:1, product to catalyst, and the product was found to have a color of 2 (Gardner), and a bromine number of 10.

Example 18

The hydrogenation of Example 12 was repeated using 0.7% platinum on the same aluminum carrier and mesh size. The space velocity was maintained at 3:1 product to catalyst, the temperature of 400° F. and a pressure of 50 p.s.i. The color of the hydrogenated product was found to be about 1 (Gardner) and the bromine number was 1.

Example 19

The run with the catalyst of Example 18 was repeated raising the temperature to 500° F., the space velocity of 1.5:1 product to catalyst being used and at a pressure of 450 p.s.i. The color of the hydrogenated product was found to be about 1 (Gardner) and the bromine number was about 0.4.

As thus described, the color, odor, and stability, particularly heat stability characteristics of substantially saturated polymers, notably lower mono-olefine polymers are markedly improved by hydrogenation under various conditions. Very light hydrogenation quickly improves the odor to a substantially odorless form. For most commercial applications, the color is improved in varying degrees depending upon the extent of hydrogenation; that is, the rate of flow of the product over the catalyst, the hydrogenation temperature, pressure, etc.; hydrogenation conditions which are known to increase the degree of hydrogenation. Amber colored commercial polyisobutylene having a pungent odor is markedly improved in both color and other characteristics by the procedure of this invention, and that color and odor does not return after substantial use and storage. In the instance of a polybutene from a lower $C_1$–$C_5$ mono-olefine mixture, the polymer should have a molecular weight of at least 300, usually about 400 to 600, with a low viscosity of about 200 to 300 (SSU @ 210° F.), up through medium to very heavy and highly viscous liquid polymers having a molecular weight generally exceeding about 18,000 to 20,000. Solid polymers thereof may have molecular weights ranging up through 150,000 and higher. The purification of the highly viscous and solid polymers may be effected by dissolving in a solvent, usually a solvent naphtha, before hydrogenation.

These polymeric products, as produced commercially, generally range in color from less than 1 (Gardner) through about 7 (Gardner) and usually have a very pungent, oily odor, somewhat variable with the purity of the raw feed gas. The commercial product may have been further purified by other methods to have somewhat better color and odor characteristics than this range, but they are not stable to heat or to store and will deteriorate in contrast to hydrogenation purified products as here defined. The polymer made according to the present invention as illustrated in the examples will have a color reduced below 2 (Gardner) and usually less than 1 (Gardner). The initial bromine number commonly ranging from about 2 to 30 variable inversely with the molecular weight will be reduced to about the range of about 5 to 8 or lower. Typically, a purified liquid polybutene polymer having a molecular weight of 400 to about 20,000 formed by polymerizing a $C_1$–$C_5$ refinery gas mixture having at least 3% of isobutylene and other olefines as described in the Jackson patent, will be purified in the hydrogenation to have a color of less than 1 (Gardner), a bromine number of 0.5 to 8, a high light, heat, and storage stability, and will be substantially odorless.

While in its preferred form, the invention has its greatest application to the purification of relatively crude polymer such as polybutenes, this type of hydrogenation may be used for purifying, in a similar way, other polymers of a substantially saturated character for which hydrogenation would usually remove only residual traces of unsaturation. Such hydrogenation will reduce odor and color forming impurities to unobjectionable components without substantial variation of the properties and normal commercial characteristics and uses for which the product was initially produced. Thus, as shown in the examples, the bromine number of the polymer is initially quite low, indicating that the unhydrogenated product is already substantially saturated, but that very slight hydrogenation quickly improves the odor. Even extensive hydrogenation reduces the color from about 2 plus (Gardner) which may be slightly amber color or darker, to about 1 (Gardner) which is comparatively water white, noticeably lighter than the original product.

Along these lines, therefore, such high molecular weight saturated polymeric products as polyethylene, polypropylene, polyamylene, and sometimes halo polymers such as polychloro-polyethylene, fluorpolyethylene, and mixed halo lower olefine polymers and interpolymers of haloolefines are usefully purified by hydrogenation according to the present invention.

Various modifications will occur to those skilled in the art including the use of other known hydrogenation catalysts and hydrogenation conditions which may be readily appied to effect the hydrogenation as described herein without departing from the spirit of the invention. It is accordingly intended that the description and several examples listed be regarded as illustrative and not limiting except as defined in the claims appended hereto.

The highly purified polymers which are substantially saturated and have been made substantially odorless, colorless, heat, and light stable may be used for applications which would not have been practical or possible for the unpurified polymers. For example, high boiling liquid colorless and odorless polymers may now be used for lubrication of delicate instruments in which the presence of unstable impurities would prevent use of such liquid. They may be used in food machinery such as in mechanical handling devices for bakery goods or other food products where the heat stable and odorless product is a useful lubricant. They may be used in the coating and sealing compositions where the water-white colorless appearance is an essential to avoid inhibiting the passage of light through transparent bodies. Other uses will be apparent to one skilled in the art.

I claim:

1. A method of purifying a substantially saturated liquid polyisobutylene polymer having a bromine number between about 2 and 30, said polymer being unstable in storage and tending to discolor and develop a pungent odor, said polymer having a molecular weight in the range of about 400 to about 20,000 and an SSU viscosity at 210° C. above 200 to convert the same to a water white substantially odorless liquid polymer, comprising lightly hydrogenating the polymer under catalytic hydrogenating conditions.

2. The process of claim 1 wherein the polymer is derived by Friedel-Crafts polymerization of a $C_2$–$C_5$ olefine gas fraction containing substantial quantities of isobutylene using finely divided aluminum chloride as the catalyst.

3. The process as defined in claim 1 wherein the polymer has a molecular weight in the range of about 840 to about 950.

4. The process as defined in claim 1 wherein the polymer has a molecular weight of about 840.

5. The process as defined in claim 1 wherein the polymer has a molecular weight of about 950.

References Cited in the file of this patent
UNITED STATES PATENTS

| | | |
|---|---|---|
| 2,461,959 | Brandon | Feb. 15, 1949 |
| 2,472,494 | Slotterbeck | June 7, 1949 |
| 2,488,145 | Smith et al. | Nov. 15, 1949 |
| 2,706,211 | Clark | Apr. 12, 1955 |
| 2,775,638 | Milliken et al. | Dec. 25, 1956 |
| 2,918,507 | Kennedy et al. | Dec. 22, 1959 |
| 2,957,930 | Jackson | Oct. 25, 1960 |
| 2,964,506 | Wicklatz et al. | Dec. 13, 1960 |
| 3,003,009 | Gurd et al. | Oct. 3, 1961 |